United States Patent
Ishikawa

(10) Patent No.: US 12,243,312 B2
(45) Date of Patent: Mar. 4, 2025

(54) STATION MONITORING APPARATUS, STATION MONITORING METHOD, AND NON-TRANSITORY COMPUTER READABLE MEDIUM

(71) Applicant: NEC Corporation, Tokyo (JP)

(72) Inventor: Masumi Ishikawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 322 days.

(21) Appl. No.: 17/789,985

(22) PCT Filed: Jan. 10, 2020

(86) PCT No.: PCT/JP2020/000684
§ 371 (c)(1),
(2) Date: Jun. 29, 2022

(87) PCT Pub. No.: WO2021/140654
PCT Pub. Date: Jul. 15, 2021

(65) Prior Publication Data
US 2022/0415053 A1 Dec. 29, 2022

(51) Int. Cl.
*G06V 20/52* (2022.01)
*B61L 25/04* (2006.01)
(Continued)

(52) U.S. Cl.
CPC .............. *G06V 20/52* (2022.01); *B61L 25/04* (2013.01); *G06T 7/20* (2013.01); *G06T 7/70* (2017.01);
(Continued)

(58) Field of Classification Search
CPC ........ G06V 20/52; G06V 10/22; G06V 40/10; B61L 25/04; B61L 25/021; B61L 23/041;
(Continued)

(56) References Cited

U.S. PATENT DOCUMENTS

| | | | | |
|---|---|---|---|---|
| 5,387,768 A | * | 2/1995 | Izard | ...................... H04N 7/188 |
| | | | | 348/E7.087 |
| 6,323,762 B1 | * | 11/2001 | Ekpo, Jr. | ................. B60R 25/33 |
| | | | | 340/426.35 |

(Continued)

FOREIGN PATENT DOCUMENTS

| | | |
|---|---|---|
| JP | H10-297491 A | 11/1998 |
| JP | 2011-240846 A | 12/2011 |

(Continued)

OTHER PUBLICATIONS

JP Office Action for JP Application No. 2021-569697, mailed on Jul. 4, 2023 with English Translation.
International Search Report for PCT Application No. PCT/JP2020/000684, mailed on Mar. 31, 2020.

*Primary Examiner* — Ali Bayat
(74) *Attorney, Agent, or Firm* — Sughrue Mion, PLLC

(57) ABSTRACT

A station monitoring apparatus (10) includes an image processing unit (110) and a decision unit (120). The image processing unit (110) determines a position of a door (50) of a vehicle (40) and a position of a person by analyzing an image generated by a capture apparatus (20), i.e., an image capturing a platform of a station. The decision unit (120) decides, after the vehicle (40) has begun to move, by use of a position of the door (50) and a position of the person, whether to perform predetermined processing. For example, the decision unit (120) performs the predetermined processing when deciding that a difference between a movement velocity of any of the persons and a movement velocity of the door is within a criterion continuously for a criterion time.

11 Claims, 9 Drawing Sheets

(51) Int. Cl.
  *G06T 7/20*    (2017.01)
  *G06T 7/70*    (2017.01)
  *G06V 10/22*   (2022.01)
  *G06V 40/10*   (2022.01)
(52) U.S. Cl.
  CPC .... *G06V 10/22* (2022.01); *G06T 2207/30196* (2013.01); *G06T 2207/30232* (2013.01); *G06V 40/10* (2022.01)
(58) Field of Classification Search
  CPC ... G06T 7/20; G06T 7/70; G06T 2207/30196; G06T 2207/30232
  USPC ......................................................... 382/103
  See application file for complete search history.

(56) References Cited

U.S. PATENT DOCUMENTS

| | | | | |
|---|---|---|---|---|
| 2013/0060429 | A1* | 3/2013 | Kim | B60K 28/12 |
| | | | | 701/48 |
| 2019/0248383 | A1* | 8/2019 | Maruta | B60R 1/06 |
| 2020/0031373 | A1* | 1/2020 | Ohki | B61K 13/04 |
| 2020/0284082 | A1* | 9/2020 | Watanabe | B61B 1/02 |
| 2022/0281411 | A1* | 9/2022 | Liu | B60R 25/305 |

FOREIGN PATENT DOCUMENTS

| | | |
|---|---|---|
| JP | 2012-011988 A | 1/2012 |
| JP | 2012-035763 A | 2/2012 |
| WO | 2018/179781 A1 | 10/2018 |

\* cited by examiner

STATION MONITORING APPARATUS, STATION MONITORING METHOD, AND NON-TRANSITORY COMPUTER READABLE MEDIUM

This application is a National Stage Entry of PCT/JP2020/000684 filed on Jan. 10, 2020, the contents of all of which are incorporated herein by reference, in their entirety.

TECHNICAL FIELD

The present invention relates to a station monitoring apparatus, a station monitoring method, and a program.

BACKGROUND ART

When a passenger gets onto a vehicle stopping at a station, the passenger or belongings of the passenger may be caught in a door of the vehicle. When the vehicle begins to move in this state, there arises a possibility that the passenger gets injured. Accordingly, Patent Document 1 describes that a human body dynamic state detection sensor is arranged in a platform with a predetermined pitch, and, in order to sense light of a light emitter mounted on a train, a plurality of light receivers are arranged in a platform with a predetermined pitch. Then, a system described in Patent Document 1 computes a movement velocity of a person by use of a detection result of the human body dynamic state detection sensor, also computes a movement velocity of a train by use of a detection result of the light receiver, and, when the two movement velocities correspond, urgently stops the train.

RELATED DOCUMENT

Patent Document

[Patent Document 1] Japanese Patent Application Publication No. H10-297491

DISCLOSURE OF THE INVENTION

Technical Problem

In a platform of a station, a person may move in the same direction as a vehicle. There is a possibility that a technique described in Patent Document 1 mistakenly determines that such a person is caught in a door of the vehicle.

An object of the present invention is to accurately sense that a person or belongings of the person are caught in a door of a vehicle.

Solution to Problem

The present invention provides a station monitoring apparatus including:
an image processing unit that determines a position of a door of a vehicle and a position of a person by analyzing an image capturing a platform of a station; and
a decision unit that decides, after the vehicle has begun to move, by use of the position of the door and the position of the person, whether to perform predetermined processing.

The present invention provides a station monitoring method including:
by a computer,
determining a position of a door of a vehicle and a position of a person by analyzing an image capturing a platform of a station; and
deciding, after the vehicle has begun to move, by use of the position of the door and the position of the person, whether to perform predetermined processing.

The present invention provides a program causing a computer to execute:
processing of determining a position of a door of a vehicle and a position of a person by analyzing an image capturing a platform of a station; and
processing of deciding, after the vehicle has begun to move, by use of the position of the door and the position of the person, whether to perform predetermined processing.

Advantageous Effects of Invention

The present invention can accurately sense that a person or belongings of the person are caught in a door of a vehicle.

BRIEF DESCRIPTION OF THE DRAWINGS

The above-described object, other objects, features, and advantageous effects will become more apparent from a preferred example embodiment described below and the following accompanying drawings.

DESCRIPTION OF EMBODIMENTS

Hereinafter, an example embodiment of the present invention is described by use of the drawings. Note that, a similar reference sign is assigned to a similar component in all the drawings, and description thereof will not be repeated accordingly.

Figure 1:
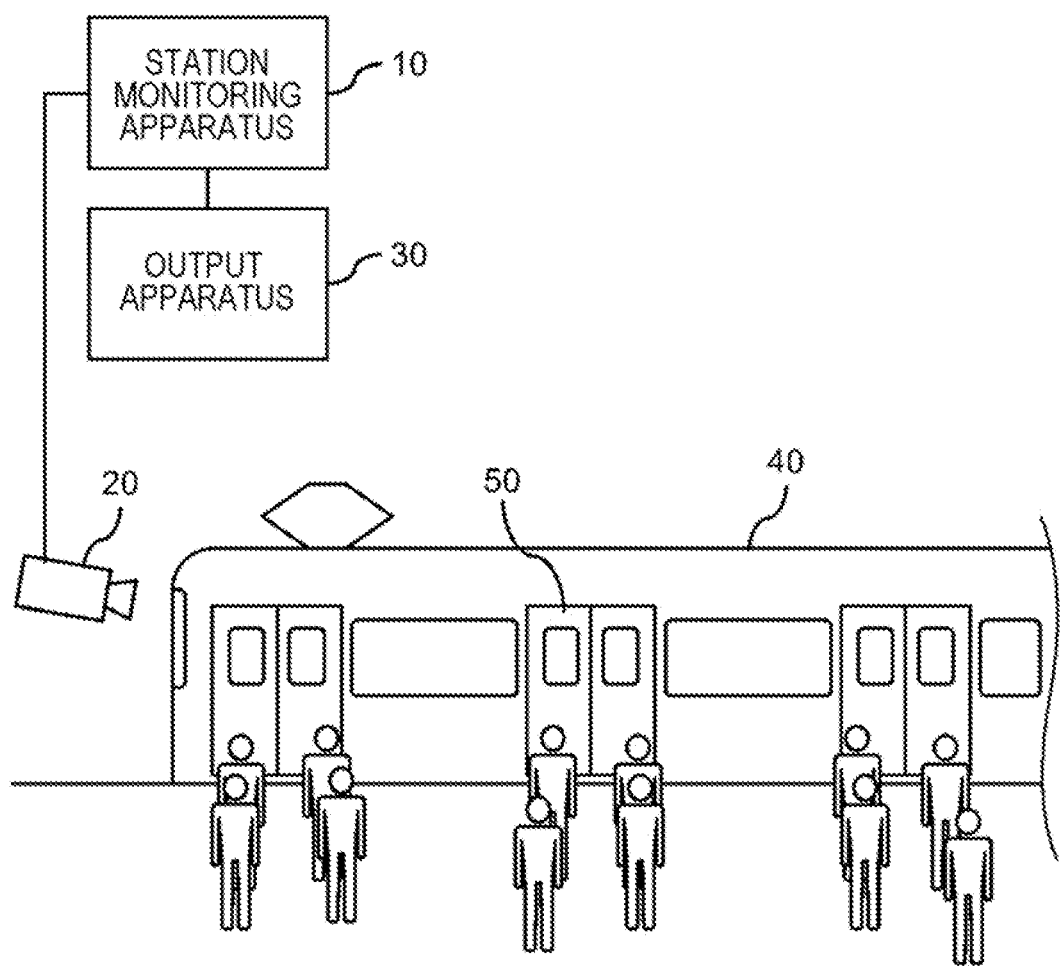
FIG. 1 is a diagram illustrating a usage environment of a station monitoring apparatus according to an example embodiment.

FIG. 1 is a diagram illustrating a usage environment of a station monitoring apparatus 10 according to an example embodiment. The station monitoring apparatus 10 is an apparatus that senses that a person or belongings of the person are caught in a door 50 of a vehicle 40 at a station, and is used together with a capture apparatus 20. The capture apparatus 20 is placed in a platform, and repeatedly generates an image. A frame rate of the capture apparatus 20 is any frame rate. A capture range of the capture apparatus 20 includes at least the door 50 of the vehicle 40 stopping at a platform, and a vicinity of the door 50. Thus, in an image generated by the capture apparatus 20, the door 50, persons getting into and out of the door 50, and a person having himself/herself or belongings caught in the door 50 are captured. Then, the station monitoring apparatus 10 processes the image generated by the capture apparatus 20, and thereby senses that the person or the belongings of the person are caught in the door 50 of the vehicle 40. In this instance, the station monitoring apparatus 10 uses a relation between a position of the person on the platform and a position of the door 50.

Then, the station monitoring apparatus 10 outputs a sensing result to an output apparatus 30. The output apparatus 30 is, for example, a display apparatus intended for a person concerned in an operation of a train. The display apparatus may be placed on the same track side of the same platform as the capture apparatus 20, or may be placed in a monitoring center. Moreover, the output apparatus 30 may be a portable terminal carried by a station employee. Moreover, the output apparatus 30 may be a speaker placed in the same platform as the capture apparatus 20. Note that, when the output apparatus 30 is a display apparatus, the output apparatus 30 may further display an image generated by the capture apparatus 20.

Figure 2:
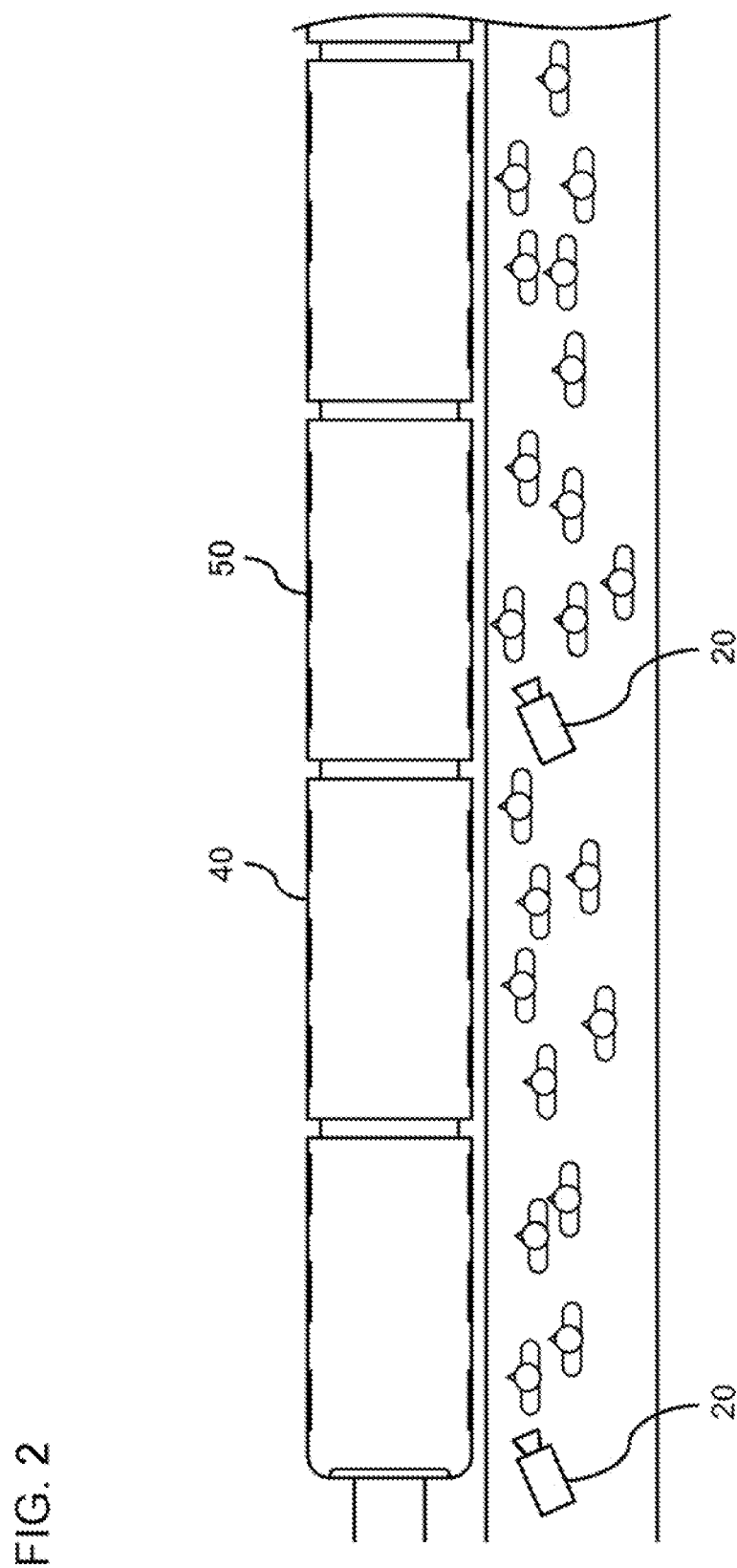
FIG. 2 is a diagram illustrating a first arrangement example of a capture apparatus.

FIG. 2 is a diagram illustrating a first arrangement example of the capture apparatus 20. In the example illustrated in the present drawing, a capture direction of the capture apparatus 20 is directed obliquely to vehicles 40. Thus, a plurality of the vehicles 40 are captured in an image generated by one capture apparatus 20. However, when the number of the vehicles 40 constituting one train is large, a plurality of the capture apparatuses 20 are placed for each single boarding place (track) of a platform.

Figure 3:
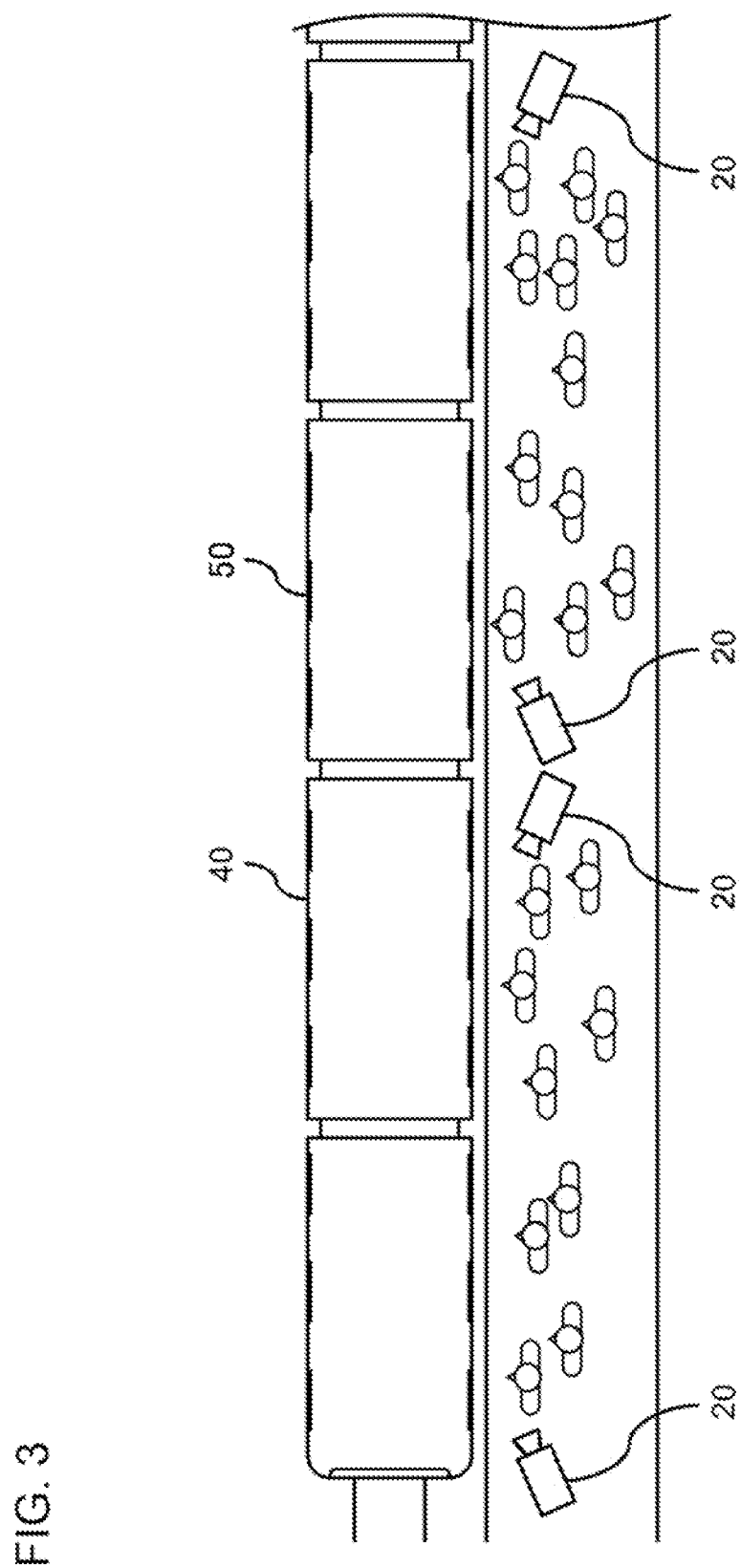
FIG. 3 is a diagram illustrating a second arrangement example of the capture apparatus.

FIG. 3 is a diagram illustrating a second arrangement example of the capture apparatus 20. In the example illustrated in the present drawing, a plurality of the capture apparatuses 20 are provided for one vehicle 40. The plurality of the capture apparatuses 20 capture the vehicle 40 from directions differing from each other. As one example, a first capture apparatus 20 is directed in a direction along a travel direction of the vehicle 40, and a second capture apparatus 20 is directed to a side opposite to the travel direction of the vehicle 40. Thus, the door 50 of the vehicle 40 can be restrained from becoming a blind spot due to a person or the like on a platform.

Figure 4:
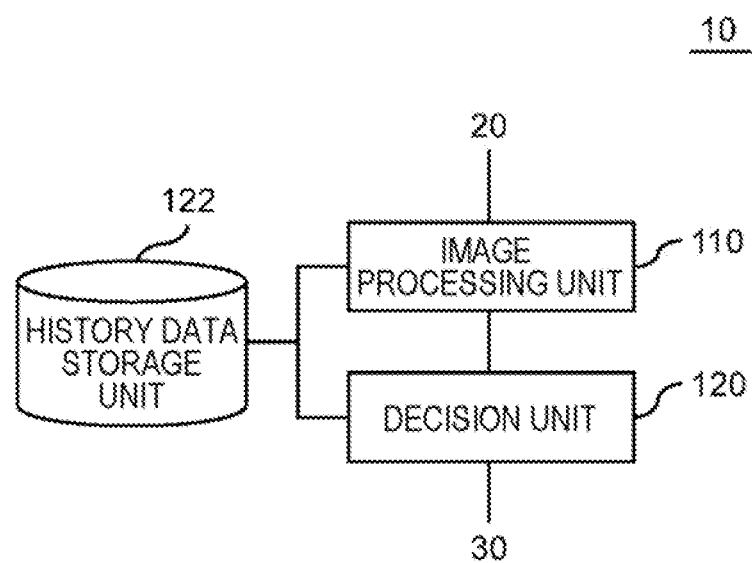
FIG. 4 is a diagram illustrating one example of a functional configuration of the station monitoring apparatus.

FIG. 4 is a diagram illustrating one example of a functional configuration of the station monitoring apparatus 10. The station monitoring apparatus 10 includes an image processing unit 110 and a decision unit 120. The image processing unit 110 determines a position of the door 50 of the vehicle 40 and a position of a person by analyzing an image generated by the capture apparatus 20, i.e., an image capturing a platform of a station. The decision unit 120 decides, after the vehicle 40 has begun to move, by use of the position of the door 50 and the position of the person, whether to perform predetermined processing.

In the example illustrated in the present drawing, the decision unit 120 uses data stored in a history data storage unit 122. The history data storage unit 122 stores at least one of history data of a position of a person and a position of a door determined by the image processing unit 110, and history data of a relative position of a position of a person and a position of a door. The decision unit 120 decides, by use of the history data, whether to perform predetermined processing. Details of processing performed by the image processing unit 110 and processing performed by the decision unit 120 are described by use of other drawings. Note that, the history data storage unit 122 may be a part of the station monitoring apparatus 10, or may be located outside of the station monitoring apparatus 10.

Figure 5A:
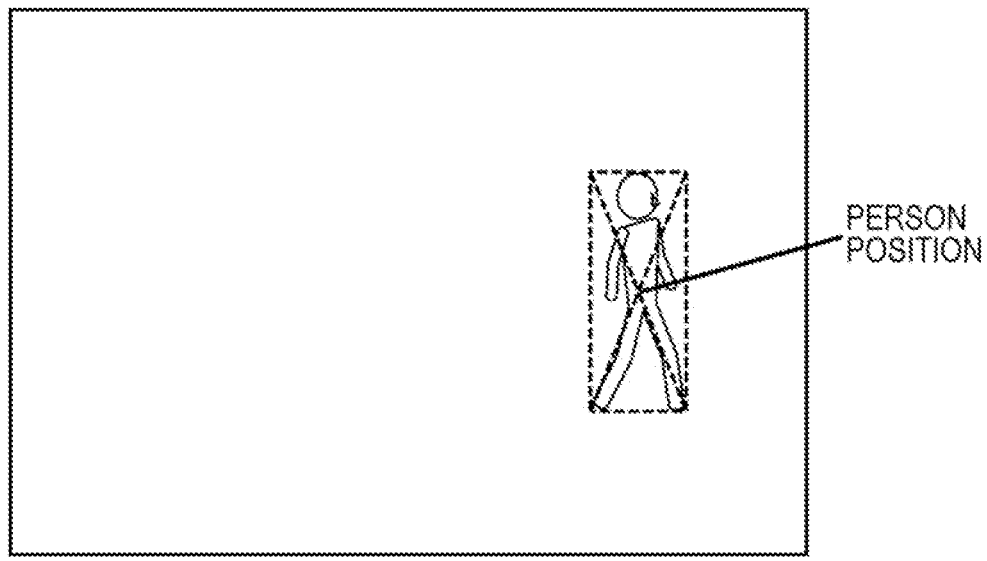
FIG. 5(A) illustrates a first example of processing in which an image processing unit senses a position of a person on a platform.

FIG. 5(A) illustrates a first example of processing in which the image processing unit 110 senses a position of a person on a platform. In the example illustrated in the present drawing, the image processing unit 110 performs, for example, feature value matching, and thereby detects a region where a person is present. Then, the image processing unit 110 determines a center of the detected region as a position of a person. In the example illustrated in the present drawing, a region where a person is present is illustrated by a rectangle. Then, the image processing unit 110 determines, as a position of the person, a center of the rectangle, i.e., an intersection point of two diagonal lines.

Figure 5B:
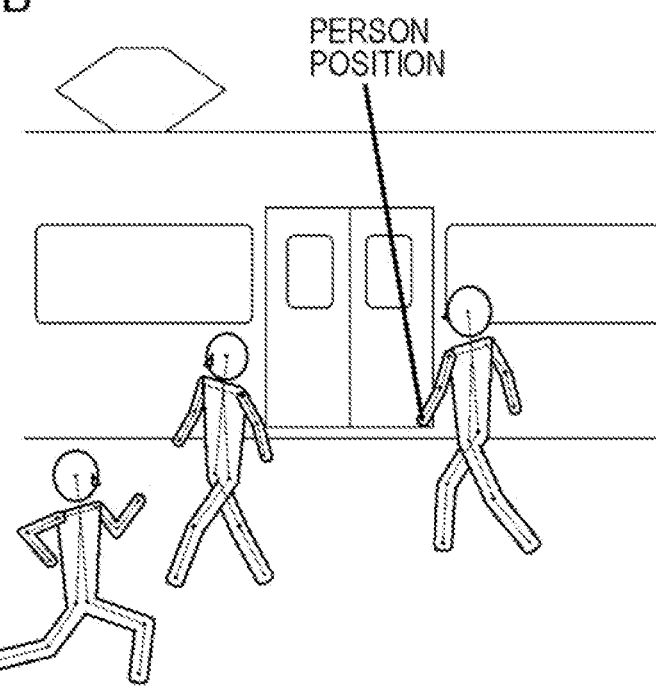
FIG. 5(B) illustrates a second example of processing in which the image processing unit senses a position of a person on a platform.

FIG. 5(B) illustrates a second example of processing in which the image processing unit 110 senses a position of a person on a platform. In the example illustrated in the present drawing, the image processing unit 110 estimates a skeleton of a person, and further estimates a position of a joint. Then, the image processing unit 110 determines, as a position of the person, a closest position to the door 50 (e.g., an end 52 or an end 54 described later) among the estimated positions of the joint, i.e., a position of the closest joint to the door 50.

Figure 6A:
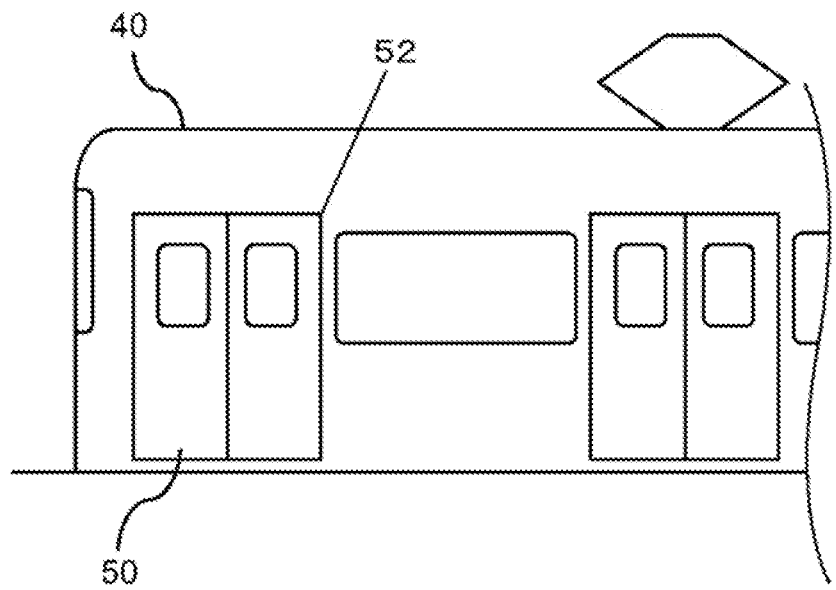
FIG. 6(A) illustrates a first example of processing in which the image processing unit senses a position of a door of a vehicle.

FIG. 6(A) illustrates a first example of processing in which the image processing unit 110 senses a position of the door 50 of the vehicle 40. In the example illustrated in the present drawing, the image processing unit 110 performs, for example, feature value matching, and thereby senses the end 52 of the door 50. Then, the sensed end 52 is determined as a position of the door. Herein, while the door 50 has four ends, the image processing unit 110 preferably uses the upper end 52 of the door 50 as a position of the door. In this way, for example, even when a lower portion of the door 50 is hidden by a platform door or the like, the image processing unit 110 can sense a position of the door 50.

Figure 6B:
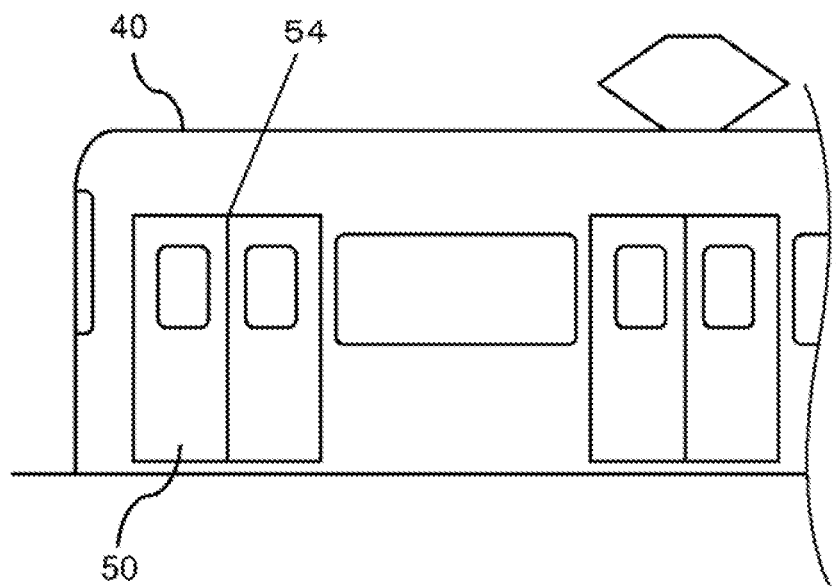
FIG. 6(B) illustrates a second example of processing in which the image processing unit senses a position of a door of a vehicle.

FIG. 6(B) illustrates a second example of processing in which the image processing unit 110 senses a position of the door 50 of the vehicle 40. The door 50 of the vehicle 40 is a double-leaf door in many cases. In such a case, the image processing unit 110 performs, for example, feature value matching, and thereby senses the end 54 of a part (hereinafter, referred to as a tangent line) in which two door leaves constituting the door 50 contact each other. Then, the sensed end 54 is determined as a position of the door. In the present example as well, the image processing unit 110 preferably uses the upper end 54 of the tangent line as a position of the door.

Figure 7:
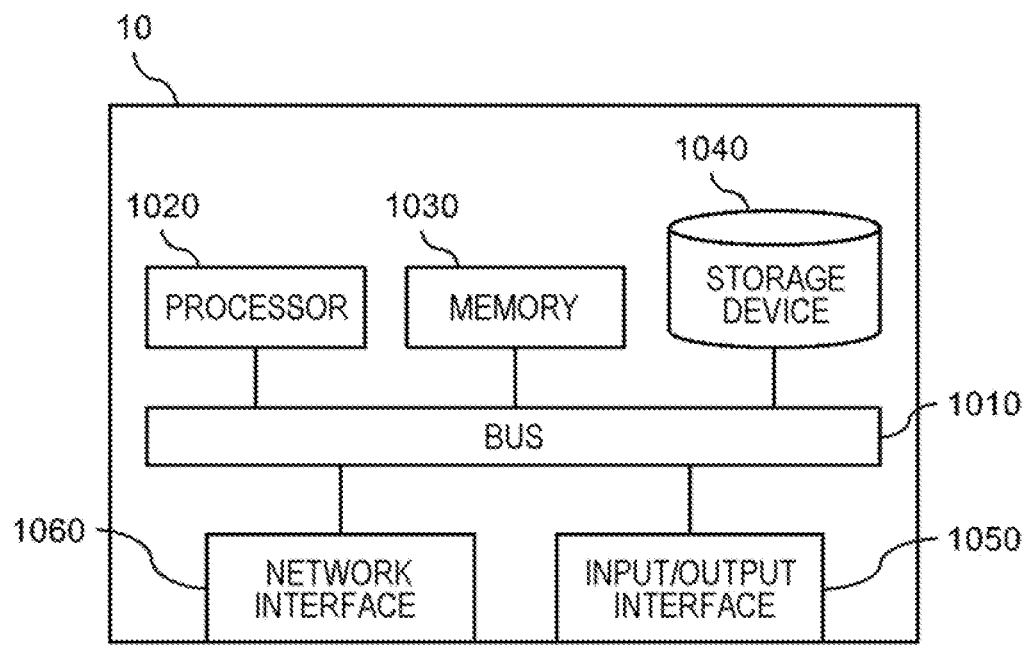
FIG. 7 is a diagram illustrating a hardware configuration example of the station monitoring apparatus.

FIG. 7 is a diagram illustrating a hardware configuration example of the station monitoring apparatus 10. The station monitoring apparatus 10 includes a bus 1010, a processor 1020, a memory 1030, a storage device 1040, an input/output interface 1050, and a network interface 1060.

The bus 1010 is a data transmission path through which the processor 1020, the memory 1030, the storage device 1040, the input/output interface 1050, and the network interface 1060 transmit/receive data to/from one another. However, a method of mutually connecting the processor 1020 and the like is not limited to bus connection.

The processor 1020 is a processor achieved by a central processing unit (CPU), a graphics processing unit (GPU), or the like.

The memory 1030 is a main storage apparatus achieved by a random access memory (RAM), or the like.

The storage device 1040 is an auxiliary storage apparatus achieved by a hard disk drive (HDD), a solid state drive (SSD), a memory card, a read only memory (ROM), or the like. The storage device 1040 stores a program module that achieves each of functions (e.g., the image processing unit 110 and the decision unit 120) of the station monitoring apparatus 10. The processor 1020 reads each of the program modules onto the memory 1030, executes the read program module, and thereby achieves each of the functions being related to the program module. Moreover, the storage device 1040 also functions as the history data storage unit 122.

The input/output interface 1050 is an interface for connecting the station monitoring apparatus 10 and various kinds of input/output equipment (e.g., the capture apparatus 20 and the output apparatus 30).

The network interface 1060 is an interface for connecting the station monitoring apparatus 10 to a network. The network is, for example, a local area network (LAN) or a wide area network (WAN). A method of connecting the network interface 1060 to a network may be wireless connection or may be wired connection. Note that, the station monitoring apparatus 10 may be connected to at least one of the capture apparatus 20 and the output apparatus 30 via the network interface 1060.

Figure 8:
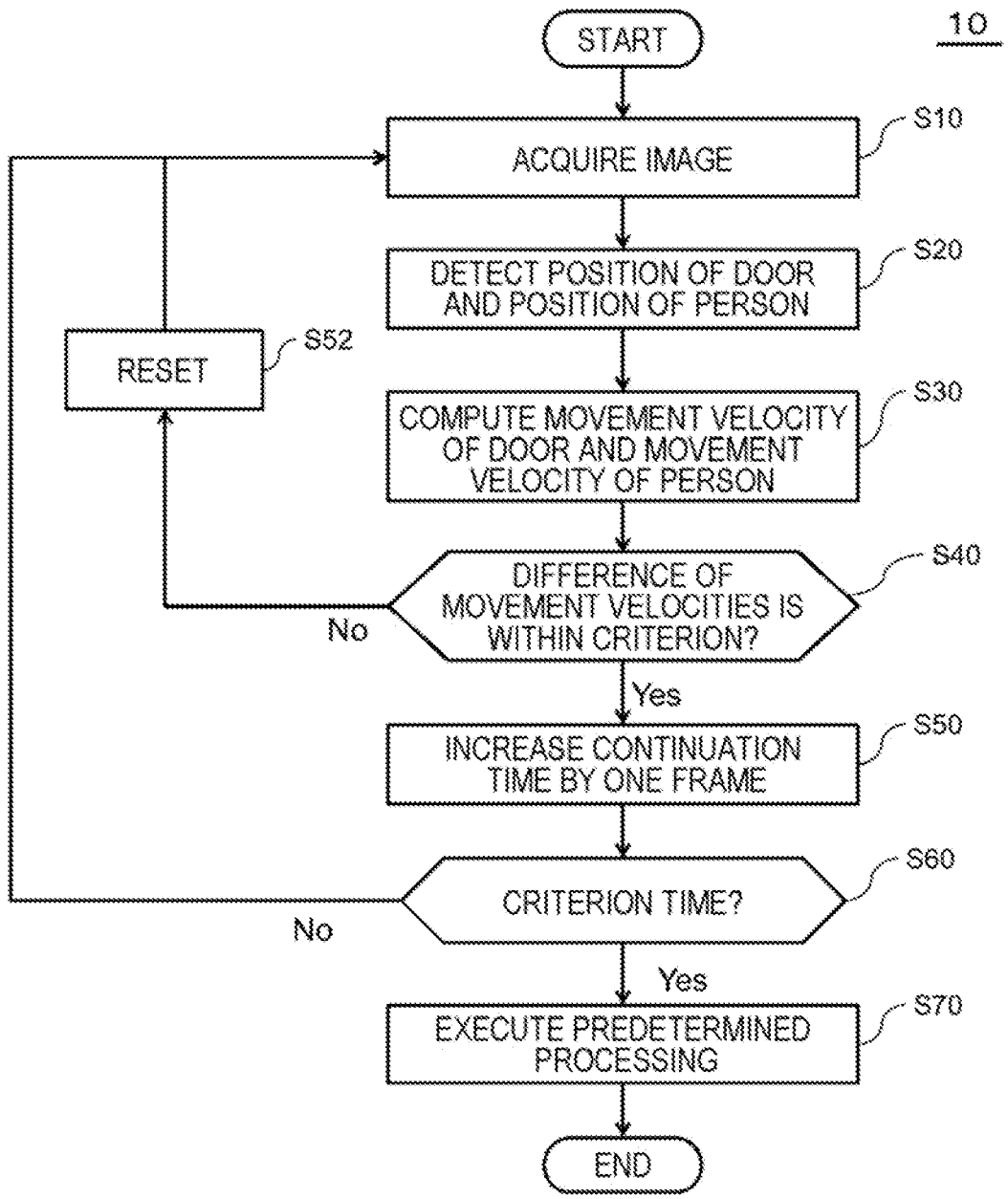
FIG. 8 is a flowchart illustrating a first example of processing performed by the station monitoring apparatus.

FIG. 8 is a flowchart illustrating a first example of processing performed by the station monitoring apparatus 10. The processing illustrated in the present drawing is performed after the vehicle 40 has begun to move. Note that, beginning of movement of the vehicle 40 is sensed by, for example, processing an image generated by the capture apparatus 20 (e.g., sensing of a change in a position of the end 52), but may be sensed by use of another method.

When having generated an image, each of the capture apparatuses 20 transmits the image to the station monitoring apparatus 10. The station monitoring apparatus 10 acquires the image from the capture apparatus 20 together with date and time information indicating a generation date and time of the image (step S10). Next, the image processing unit 110 and the decision unit 120 perform the following processing for each of all the doors 50 that the vehicle 40 has.

First, the image processing unit 110 senses a position of a person and a position of the door 50 included in the image, and stores a sensing result in the history data storage unit 122 as data being associated with the date and time information, i.e., the history data described above (step S20). Herein, the decision unit 120 preferably limits a person to be a sensing target to a person located within a predetermined distance (e.g., within 2 m) from the door 50. For example, the decision unit 120 senses a position of the door 50 by processing the image first. Next, the decision unit 120 decides, as a region of a sensing processing target of a person, a region located within a predetermined distance from the door 50 sensed in the image. In this way, a processing load of the station monitoring apparatus 10 can be reduced.

Then, the decision unit 120 computes a movement velocity of a position of the door 50 by use of the history data stored by the history data storage unit 122, and a position of the door 50 currently generated by the image processing unit 110. Moreover, the decision unit 120 computes a movement velocity of a position of a person by use of the history data stored by the history data storage unit 122, and a position of the person currently generated by the image processing unit 110 (step S30). A velocity of the door 50 and a velocity of a person are indicated by, for example, the number of movement pixels/one frame (or a unit time), or an actual movement distance/one frame (or a unit time). Then, when a difference of the two computed movement velocities is within a criterion (step S40: Yes), the decision unit 120 increases a value of a counter, i.e., a continuation time by one frame (step S50). Then, when the value of the counter has reached a criterion, i.e., when a state in which a difference between the movement velocity of the door 50 and the movement velocity of the person is within a criterion continues for a time equal to or more than a criterion time (step S60: Yes), a possibility that a person or belongings of the person are caught in the door 50 is high, and, therefore, the decision unit 120 executes predetermined processing (step S70). A criterion (criterion time) in the step S60 is, for example, equal to or more than $1/30$ seconds. Moreover, the criterion is preferably equal to or less than one second. Moreover, processing performed in the step S70 is, for example, processing of stopping the vehicle 40 having the door 50. In this instance, the decision unit 120 may cause a speaker placed in a station to output a caution sound.

Note that, in the step S60, a criterion time may not be a fixed value, and may vary in response to a movement distance (the number of movement pixels) per unit time. Specifically, as a movement distance per unit time becomes long, a criterion time is shortened. For example, when the number of movement pixels of the door 50 between a certain time T and a time T+α exceeds the predetermined number of pixels (e.g., equal to or more than 10 pixels), a time interval α is set to a criterion time. In other words, the time interval α taken for the number of movement pixels of the door 50 to exceed a predetermined number of pixels is set to a criterion time. By allowing a criterion time to be dynamic in this way, the criterion time can be prolonged at a time point when an electric train begins to run, and the criterion time can be shortened when the electric train reaches a given velocity. This reduces such a risk that a criterion time is too short and an influence of minute noise is received, or a criterion time is too long and a decision becomes excessively late, and enables an optimum criterion time to be set in response to a running speed of an electric train.

Moreover, in the step S40, the decision unit 120 computes a difference of the two movement velocities as a vector. Then, a component (e.g., a movement direction of the vehicle 40) in a particular direction of the vector is preferably a basis for decision. For example, when a component in the movement direction of the vehicle 40 is less than a criterion regarding a vector representing a difference of the two movement velocities, movement amounts of a person and an electric train may be decided to be equal. An influence of noise resulting from a body movement of a person can be eased by making decision only based on a component in a movement direction of the vehicle 40.

Moreover, the decision unit 120 preferably outputs, to the output apparatus 30, information (hereinafter, referred to as door position information) indicating a position of the door 50 being high in a possibility of catching a person or belongings of the person (i.e., the door 50 decided to have reached a criterion in the step S60). As described above, the output apparatus 30 is, for example, a portable terminal carried by a station employee and/or a display apparatus placed in a station. In this way, an action of a station employee can be accelerated. Note that, door position information output to the output apparatus 30 is generated by use of, for example, a position of the door 50 (e.g., positions of the ends 52 and 54) sensed by the image processing unit 110.

Herein, door position information output to the output apparatus 30 may include, for example, a position of the capture apparatus 20 that has generated an image in which the door 50 is captured. In this case, the capture apparatus 20 transmits identification information of the capture apparatus 20 to the station monitoring apparatus 10 together with the image. Then, the station monitoring apparatus 10 previously stores the identification information of the capture apparatus 20 in association with a position of the capture apparatus 20. Then, the decision unit 120 determines, by use of the stored information, a position being related to the identification information transmitted from the capture apparatus 20.

Note that, when the difference of the movement velocities is more than the criterion in the step S40, the decision unit 120 resets a value of the counter (step S52), and returns to the step S10.

Figure 9:
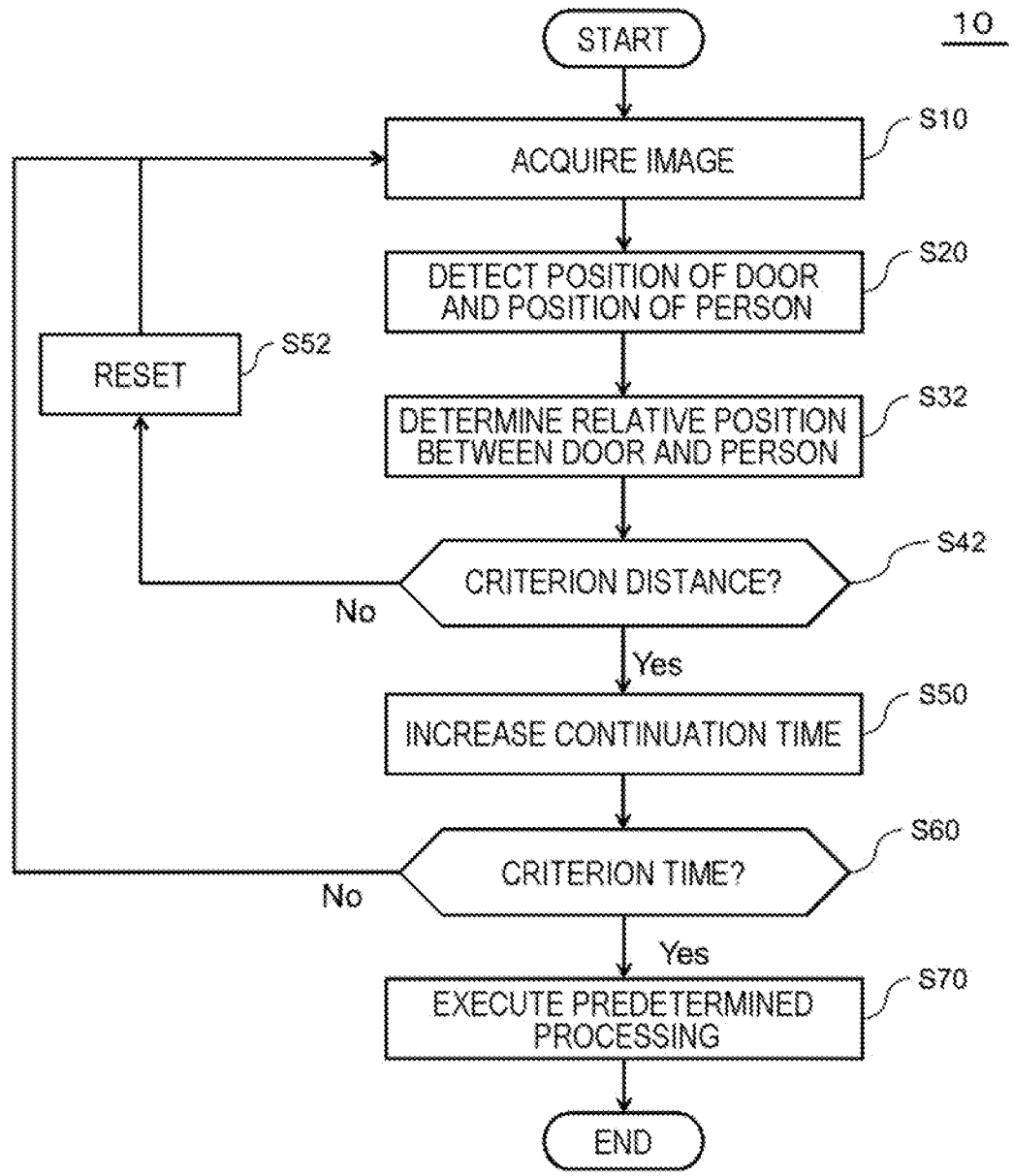
FIG. 9 is a flowchart illustrating a second example of processing performed by the station monitoring apparatus.

FIG. 9 is a flowchart illustrating a second example of processing performed by the station monitoring apparatus 10. In the example illustrated in the present drawing, the decision unit 120 performs the following processing, instead of the step S 30 of computing a movement velocity of a door and a movement velocity of a person, and the step S40 of using a difference thereof for decision.

When the image processing unit 110 senses a position of a door and a position of a person (step S20), the decision unit 120 computes a difference between the two positions. The difference indicates a relative distance between the door and the person (step S32). Then, when a relative position is equal to or less than a criterion value (step S42: Yes), the decision unit 120 performs processing in and after step S50. Moreover, when a relative position is more than the criterion value (step S42 No), the decision unit 120 resets a counter (step S52), and returns to step S10.

As above, according to the present example embodiment, the station monitoring apparatus 10 determines a position of the door 50 of the vehicle 40 and a position of a person by analyzing an image capturing a platform of a station. Then, whether to perform predetermined processing is decided by use of the positions. For example, even when a person moves at a velocity close to the vehicle 40 at a place being distant from the door 50, the station monitoring apparatus 10 does not decide that the person or belongings of the person are caught in the door 50. Moreover, even when belongings of a person caught in the door 50 are thin belongings, such a fact can be sensed. Thus, a fact that a person or belongings of the person are caught in the door 50 can be accurately sensed.

While an example embodiment of the present invention has been described above with reference to the drawings, the example embodiment is an exemplification of the present invention, and various configurations other than the configuration described above can also be adopted.

Moreover, although a plurality of processes (pieces of processing) are described in order in a plurality of flowcharts used in the above description, an execution order of processes executed in each example embodiment is not limited to the described order. In each example embodiment, an order of illustrated processes can be changed to an extent that causes no problem in terms of content. Moreover, each of the example embodiments described above can be combined to an extent that content does not contradict.

Some or all of the above-described example embodiments can also be described as, but are not limited to, the following supplementary notes.

1. A station monitoring apparatus including:
    an image processing unit that determines a position of a door of a vehicle and a position of a person by analyzing an image capturing a platform of a station; and
    a decision unit that decides, after the vehicle has begun to move, by use of the position of the door and the position of the person, whether to perform predetermined processing.
2. The station monitoring apparatus according to supplementary note 1, in which
    the decision unit performs the predetermined processing when deciding that a difference between a movement velocity of any of the persons and a movement velocity of the door is within a criterion continuously for a criterion time.
3. The station monitoring apparatus according to supplementary note 1, in which
    the decision unit performs the predetermined processing when deciding that a relative distance between any of the persons and the door is within a criterion continuously for a criterion time.
4. The station monitoring apparatus according to supplementary note 2 or 3, in which
    the criterion time is equal to or more than 1/30 seconds.
5. The station monitoring apparatus according to any one of supplementary notes 1 to 4, in which
    the position of the door is an end of the door.
6. The station monitoring apparatus according to any one of supplementary notes 1 to 4, in which
    the door is a double-leaf door, and
    the position of the door is an end of a tangent line of two door leaves.
7. The station monitoring apparatus according to any one of supplementary notes 1 to 6, in which
    the image processing unit determines, as the position of the person, a center of a region where the person is present.
8. The station monitoring apparatus according to any one of supplementary notes 1 to 6, in which
    the image processing unit estimates a position of a joint of the person, and determines, as the position of the person, a closest position to the position of the door among the estimated positions of the joints.
9. The station monitoring apparatus according to any one of supplementary notes 1 to 8, in which
    the predetermined processing includes processing of stopping the vehicle.
10. The station monitoring apparatus according to any one of supplementary notes 1 to 9, in which
    the predetermined processing includes output of information indicating the position of the door.
11. The station monitoring apparatus according to supplementary note 10, in which
    the decision unit outputs information indicating the position of the door to a portable terminal carried by a station employee.
12. A station monitoring method including:
    by a computer,
        determining a position of a door of a vehicle and a position of a person by analyzing an image capturing a platform of a station; and
        deciding, after the vehicle has begun to move, by use of the position of the door and the position of the person, whether to perform predetermined processing.

13. The station monitoring method according to supplementary note 12, further including,
by the computer,
performing the predetermined processing when deciding that a difference between a movement velocity of any of the persons and a movement velocity of the door is within a criterion continuously for a criterion time.
14. The station monitoring method according to supplementary note 12, further including,
by the computer,
performing the predetermined processing when deciding that a relative distance between any of the persons and the door is within a criterion continuously for a criterion time.
15. The station monitoring method according to supplementary note 13 or 14, in which
the criterion time is equal to or more than 1/30 seconds.
16. The station monitoring method according to any one of supplementary notes 12 to 15, in which
the position of the door is an end of the door.
17. The station monitoring method according to any one of supplementary notes 12 to 15, in which
the door is a double-leaf door, and
the position of the door is an end of a tangent line of two door leaves.
18. The station monitoring method according to any one of supplementary notes 12 to 17, further including,
by the computer,
determining, as the position of the person, a center of a region where the person is present.
19. The station monitoring method according to any one of supplementary notes 12 to 17, further including,
by the computer,
estimating a position of a joint of the person, and determining, as the position of the person, a closest position to the position of the door among the estimated positions of the joints.
20. The station monitoring method according to any one of supplementary notes 12 to 19, in which
the predetermined processing includes processing of stopping the vehicle.
21. The station monitoring method according to any one of supplementary notes 12 to 20, in which
the predetermined processing includes output of information indicating the position of the door.
22. The station monitoring method according to supplementary note 21, further including,
by the computer,
outputting information indicating the position of the door to a portable terminal carried by a station employee.
23. A program causing a computer to execute:
processing of determining a position of a door of a vehicle and a position of a person by analyzing an image capturing a platform of a station; and
processing of deciding, after the vehicle has begun to move, by use of the position of the door and the position of the person, whether to perform predetermined processing.
24. The program according to supplementary note 23, further causing the computer to execute
the predetermined processing when deciding that a difference between a movement velocity of any of the persons and a movement velocity of the door is within a criterion continuously for a criterion time.
25. The program according to supplementary note 23, further causing the computer to execute
the predetermined processing when deciding that a relative distance between any of the persons and the door is within a criterion continuously for a criterion time.
26. The program according to supplementary note 24 or 25, in which
the criterion time is equal to or more than 1/30 seconds.
27. The program according to any one of supplementary notes 23 to 26, in which
the position of the door is an end of the door.
28. The program according to any one of supplementary notes 23 to 26, in which
the door is a double-leaf door, and
the position of the door is an end of a tangent line of two door leaves.
29. The program according to any one of supplementary notes 23 to 28, further causing the computer to execute
deciding, as the position of the person, a center of a region where the person is present.
30. The program according to any one of supplementary notes 23 to 28, further causing the computer to execute
estimating a position of a joint of the person, and deciding, as the position of the person, a closest position to the position of the door among the estimated positions of the joints.
31. The program according to any one of supplementary notes 23 to 30, in which
the predetermined processing includes processing of stopping the vehicle.
32. The program according to any one of supplementary notes 23 to 31, in which
the predetermined processing includes output of information indicating the position of the door.
33. The program according to supplementary note 32, further causing the computer to execute
outputting information indicating the position of the door to a portable terminal carried by a station employee.

REFERENCE SIGNS LIST

10 Station monitoring apparatus
20 Capture apparatus
30 Output apparatus
40 Vehicle
50 Door
52 End
54 End
110 Image processing unit
120 Decision unit
122 History data storage unit

What is claimed is:
1. A station monitoring apparatus comprising:
at least one memory configured to store instructions; and
at least one processor configured to execute the instructions to perform operations comprising:
determining a position of a door of a vehicle and a position of a person by analyzing an image capturing a platform of a station; and
deciding, after the vehicle has begun to move, by use of the position of the door and the position of the person, whether to perform predetermined processing that includes processing of stopping the vehicle,
wherein the operations further comprise performing the predetermined processing when deciding that a difference between a movement velocity of any of the persons and a movement velocity of the door is within a criterion continuously for a criterion time.

2. The station monitoring apparatus according to claim 1, wherein
the operations further comprise performing the predetermined processing when deciding that a relative distance between any of the persons and the door is within a criterion continuously for a criterion time.

3. The station monitoring apparatus according to claim 1, wherein
the criterion time is equal to or more than $\frac{1}{30}$ seconds.

4. The station monitoring apparatus according to claim 1, wherein
the position of the door is an end of the door.

5. The station monitoring apparatus according to claim 1, wherein
the door is a double-leaf door, and
the position of the door is an end of a tangent line of two door leaves.

6. The station monitoring apparatus according to claim 1, wherein
the operations further comprise determining, as the position of the person, a center of a region where the person is present.

7. The station monitoring apparatus according to claim 1, wherein the operations further comprise:
estimating a position of a joint of the person; and
determining, as the position of the person, a closest position to the position of the door among the estimated positions of the joints.

8. The station monitoring apparatus according to claim 1, wherein
the predetermined processing includes output of information indicating the position of the door.

9. The station monitoring apparatus according to claim 8, wherein
the operations further comprise outputting information indicating the position of the door to a portable terminal carried by a station employee.

10. A station monitoring method comprising:
by a computer,
determining a position of a door of a vehicle and a position of a person by analyzing an image capturing a platform of a station; and
deciding, after the vehicle has begun to move, by use of the position of the door and the position of the person, whether to perform predetermined processing that includes processing of stopping the vehicle,
wherein the method further comprises performing the predetermined processing when deciding that a difference between a movement velocity of any of the persons and a movement velocity of the door is within a criterion continuously for a criterion time.

11. A non-transitory computer readable medium storing a program causing a computer to execute operations comprising:
determining a position of a door of a vehicle and a position of a person by analyzing an image capturing a platform of a station; and
deciding, after the vehicle has begun to move, by use of the position of the door and the position of the person, whether to perform predetermined processing that includes processing of stopping the vehicle,
wherein the program causes the computer to perform the predetermined processing when deciding that a difference between a movement velocity of any of the persons and a movement velocity of the door is within a criterion continuously for a criterion time.

* * * * *